US011500997B1

(12) United States Patent
Bongiorni et al.

(10) Patent No.: US 11,500,997 B1
(45) Date of Patent: Nov. 15, 2022

(54) ICS THREAT MODELING AND INTELLIGENCE FRAMEWORK

(71) Applicant: Bentley Systems, Incorporated, Exton, PA (US)

(72) Inventors: Luca Bongiorni, Vilnius (LT); Louis Nadeau, Quebec (CA)

(73) Assignee: Bentley Systems, Incorporated, Exton, PA (US)

(*) Notice: Subject to any disclaimer, the term of this patent is extended or adjusted under 35 U.S.C. 154(b) by 960 days.

(21) Appl. No.: 16/263,982

(22) Filed: Jan. 31, 2019

Related U.S. Application Data

(60) Provisional application No. 62/734,254, filed on Sep. 20, 2018.

(51) Int. Cl.
| | | |
|---|---|---|
| *G06F 3/048* | (2013.01) |
| *G06F 21/57* | (2013.01) |
| *G06F 21/56* | (2013.01) |
| *G06F 3/0482* | (2013.01) |
| *G06F 16/28* | (2019.01) |

(Continued)

(52) U.S. Cl.
CPC ........... *G06F 21/577* (2013.01); *G05B 17/02* (2013.01); *G06F 3/0482* (2013.01); *G06F 16/284* (2019.01); *G06F 21/56* (2013.01); *G06F 30/20* (2020.01); *G06F 2111/20* (2020.01)

(58) Field of Classification Search
CPC .... G06F 3/0482; G06F 30/20; G06F 2111/20; G06F 30/00; G06F 30/13; G06F 30/367; G06F 2111/04; G06F 30/33; G06F 2111/12; G06F 2111/08; G06F 30/12; G06F 16/29; G06F 3/0481; H04L 63/1416; H04L 63/145; H04L 63/1433
See application file for complete search history.

(56) References Cited

U.S. PATENT DOCUMENTS

| | | | |
|---|---|---|---|
| 8,091,065 B2 | 1/2012 | Mir et al. | |
| 8,132,260 B1 * | 3/2012 | Mayer | H04L 67/125 |
| | | | 726/25 |

(Continued)

OTHER PUBLICATIONS

"Getting Started With the Threat Modeling Tool," Microsoft, Microsoft Azure, Microsoft Docs, Retrieved from <https://docs.microsoft.com/en-us/azure/security/azure-security-threat-modeling-tool-getting-started>, Aug. 16, 2017, pp. 1-5.

(Continued)

*Primary Examiner* — Steven B Theriault
(74) *Attorney, Agent, or Firm* — Cesari and McKenna, LLP; James A. Blanchette (57) ABSTRACT

In one embodiment, techniques are provided for improved security threat modeling and threat intelligence for infrastructure managed by ICSs. The techniques may leverage an existing model of an ICS created in a CAD application, add to the model security properties specifying configuration of respective electronic components of the ICS, and analyze the resulting combination, together with information from a threat database to automatically generate output such as a threat model diagram, threat model report or an interactive threat intelligence dashboard. A visualization of the output may be displayed together with, or include, a graphical rendering of the infrastructure managed to aid in its interpretation.

20 Claims, 12 Drawing Sheets

(51) Int. Cl.
  *G05B 17/02* (2006.01)
  *G06F 30/20* (2020.01)
  *G06F 111/20* (2020.01)

(56) References Cited

U.S. PATENT DOCUMENTS

| | | | | |
|---|---|---|---|---|
| 9,383,890 | B2* | 7/2016 | Grubbs | G06F 3/0481 |
| 10,348,758 | B1* | 7/2019 | Holl | G06F 3/0484 |
| 10,769,283 | B2* | 9/2020 | Poirel | G06F 16/26 |
| 10,862,692 | B2* | 12/2020 | Shahrjerdi | C09K 11/681 |
| 10,867,087 | B2* | 12/2020 | Meagher | H02J 13/0003 |
| 11,409,888 | B2* | 8/2022 | Kawakita | G06F 21/54 |
| 2002/0038430 | A1* | 3/2002 | Edwards | H04L 29/06 726/26 |
| 2005/0235360 | A1* | 10/2005 | Pearson | H04L 41/046 726/23 |
| 2007/0136788 | A1* | 6/2007 | Monahan | H04L 63/20 726/14 |
| 2007/0174027 | A1* | 7/2007 | Moiseyev | G06F 30/13 703/1 |
| 2007/0179976 | A1* | 8/2007 | Arvin | G06F 30/00 |
| 2007/0294766 | A1 | 12/2007 | Mir et al. | |
| 2008/0209506 | A1* | 8/2008 | Ghai | G06F 21/604 726/16 |
| 2009/0004410 | A1* | 1/2009 | Thomson | G06Q 10/00 428/29 |
| 2009/0327971 | A1* | 12/2009 | Shostack | H04L 63/1425 715/853 |
| 2009/0328223 | A1* | 12/2009 | Medvedev | G06F 21/577 726/25 |
| 2010/0131903 | A1* | 5/2010 | Thomson | G06F 8/38 715/847 |
| 2010/0281536 | A1* | 11/2010 | Richards | H04L 63/101 726/22 |
| 2011/0277034 | A1* | 11/2011 | Hanson | G06F 21/554 709/224 |
| 2012/0179276 | A1* | 7/2012 | Kolenc | G06Q 10/06 700/79 |
| 2014/0137257 | A1* | 5/2014 | Martinez | H04L 63/1433 726/25 |
| 2015/0288712 | A1* | 10/2015 | Jones | H04L 63/1433 726/25 |
| 2015/0347759 | A1* | 12/2015 | Cabrera | H04L 63/1425 726/25 |
| 2016/0036835 | A1* | 2/2016 | Lietz | H04L 63/145 726/22 |
| 2016/0308890 | A1* | 10/2016 | Weilbacher | H04L 63/1408 |
| 2016/0344772 | A1* | 11/2016 | Monahan | G06F 21/577 |
| 2017/0090742 | A1* | 3/2017 | Ade | G01B 5/012 |
| 2017/0169230 | A1* | 6/2017 | Zheng | G06N 20/00 |
| 2017/0346846 | A1* | 11/2017 | Findlay | H04L 63/1433 |
| 2018/0075168 | A1* | 3/2018 | Tiwari | G06T 3/0068 |
| 2018/0084012 | A1* | 3/2018 | Joseph | H04L 63/108 |
| 2018/0129276 | A1* | 5/2018 | Nguyen | G06F 3/011 |
| 2018/0159876 | A1* | 6/2018 | Park | H04L 63/1425 |
| 2018/0278628 | A1* | 9/2018 | Kumar Kn | H04W 12/08 |
| 2018/0302420 | A1* | 10/2018 | Nakanelua | H04L 63/1425 |
| 2018/0324194 | A1* | 11/2018 | Nakanelua | H04L 41/0677 |
| 2018/0336355 | A1* | 11/2018 | Agarwal | H04L 63/1441 |
| 2018/0337939 | A1* | 11/2018 | Agarwal | G06F 16/26 |
| 2019/0052638 | A1* | 2/2019 | Agarwal | H04L 63/08 |
| 2019/0180041 | A1* | 6/2019 | Bhunia | G06F 13/28 |
| 2019/0236493 | A1* | 8/2019 | Cam-Winget | G06N 20/00 |
| 2019/0297095 | A1* | 9/2019 | Formby | G05B 19/058 |
| 2019/0325144 | A1* | 10/2019 | Doukhvalov | G06F 11/3664 |
| 2019/0347366 | A1* | 11/2019 | Krylov | G06Q 10/0635 |
| 2020/0044887 | A1* | 2/2020 | Jayanath Wewalaarachchi | H04L 12/2812 |
| 2020/0124401 | A1* | 4/2020 | Murata | G06F 30/13 |
| 2020/0159888 | A1* | 5/2020 | Ghose | G06F 9/3842 |
| 2021/0109718 | A1* | 4/2021 | Brown | G06N 20/00 |

OTHER PUBLICATIONS

"Microsoft Threat Modeling Tool Mitigations," Microsoft, Microsoft Azure, Microsoft Docs, Retrieved from <https://docs.microsoft.com/en-us/azure/security/azure-security-threat-modeling-tool-mitigations>, Aug. 16, 2017, one page.

"Microsoft Threat Modeling Tool Threats," Microsoft, Microsoft Azure, Microsoft Docs, Retrieved from <https://docs.microsoft.com/en-us/azure/security/azure-security-threat-modeling-tool-threats>, Aug. 16, 2017, one page.

"Threat Modeling Tool Feature Overview," Microsoft, Microsoft Azure, Microsoft Docs, Retrieved from <https://docs.microsoft.com/en-us/azure/security/azure-security-threat-modeling-tool-feature-overview>, Aug. 16, 2017, pp. 1-7.

\* cited by examiner

| User Guide | | | | Chapter 1 Introduction |
|---|---|---|---|---|

- Port Default
  The default state of the port (i.e. open or closed)
- Access Authorized
  Denotes whether the ports/services are authenticated during access

| Services | Port Number | Port Open | Port Default | Access Authorized |
|---|---|---|---|---|
| SSH | TCP/22 | Open (if configured with login) | Open | Yes |
| SSH (Service Mode) | TCP/222 | Open | Open | Yes |
| NETCONF | TCP/830 | Open (if configured with login) | Open | Yes |
| SFTP | TCP/2222 | Open (if configured with login) | Closed | Yes |
| HTTP | TCP/80 | Open (if configured with login) | Open | N/A |
| NTP | UDP/123 | Open (if configured) | Closed | No |
| SNMP | UDP/161 | Open (if configured with login) | Closed | Yes |
| HTTPS | TCP/443 | Open (if configured with login) | Open | Yes |
| TCP Modbus | TCP/502 | Open (if configured) | Closed | No |
| IPSec IKE | UDP/500 | Open (if configured) | Closed | Yes |
| IPSec NAT-T | UDP/4500 | Open (if configured) | Closed | Yes |
| DNPv3 | TCP/20000 | Open (if configured) | Closed | No |
| RawSocket | TCP/configured | Open (if configured) | Closed | No |
| DHCP Agent | UDP/67 | Open (if configured) | Closed | No |
| DHCP Server | UDP/67 listening, 68 responding | Open (if configured) | Closed | No |
| RADIUS | UDP/1812 to send, opens random port to listen | Open (if configured) | Closed | Yes |
| L2TP | Random Port | Open (if configured) | Closed | Yes |

ICS THREAT MODELING AND INTELLIGENCE FRAMEWORK

RELATED APPLICATIONS

The present application claims priority to U.S. Provisional Patent Application No. 62/734,254 by Luca Bongiorni et al., filed on Sep. 20, 2018, titled "ICS Threat Modeling & Intelligence Framework", the contents of which are incorporated by reference herein in their entirety.

BACKGROUND

Technical Field

The present disclosure relates generally to security threats in electronic systems, and more specifically to techniques for threat modeling and threat intelligence for an industrial control system (ICS) that manages infrastructure.

Background Information

A variety of infrastructure (e.g., plants, transportation systems, communication systems, water/sewage distribution systems, and other industrial systems) are managed by ICSs, including supervisory control and data acquisition (SCADA) systems and distributed control systems (DCS) that include software executing on hardware devices. In recent years there has been increasing security threats exploiting these ICSs, demonstrated by a number of high profile attacks. For example, in 2000 a former employee hacked the Maroochy Shire, Queensland computerized waste management system and caused millions of liters of raw sewage to spill out into local parks and rivers. In 2003, the "Slammer" worm disabled a safety monitoring system at the Davis-Besse nuclear power plant in North Perry, Ohio. In 2008, a Polish teenager hacked the control system of the tram system in Lodz, Poland, and caused the derailment of multiple railway vehicles. In 2010, the "Stuxnet" worm infiltrated control software and caused the destruction of centrifuges at a uranium enrichment site in Natanz, Iran. Further, in 2011, a malware infection disrupted the dispatching system and delayed ambulance response throughout a large portion of New Zealand.

With the advent of new technologies, such as the Internet of Things (IoT), smart sensors and mesh networks, ICSs have become more vulnerable to security threats. These technologies have multiplied entry points and increased the attack surface. However, companies and government agencies have been slow to realize the increasing danger to their infrastructure due to attacks to ICSs, and have often failed to take sufficient preventative measures.

A number of techniques have been utilized over the years to address security threats in the application security (AppSec) space. The AppSec space focuses on improving security of software applications by finding, fixing and preventing security vulnerabilities. One technique that has been used is threat modeling. Threat modeling is a procedure for optimizing security by identifying objectives and vulnerabilities during system development, and then defining countermeasures to mitigate those vulnerabilities. A number of companies have promoted the use of threat modeling for AppSec, including Microsoft as part of the Microsoft Secure Development Lifecycle (SDL) process. Another technique that has been used in AppSec is threat intelligence. Threat intelligence is a procedure to organize, analyze and refine information about potential or current attacks. In AppSec, the emphasis of threat intelligence is generally on the types of threats that are most likely to affect a deployed system.

While threat modeling and threat intelligence have been widely used in the AppSec space, they have seen limited utilization with respect to infrastructure managed by ICSs, such as SCADA or DCS systems. This is due to a number of factors. Typically, attempts at use have been on an ad hoc basis, involving manual processes and general-purpose software (e.g., manually building spread sheets and diagrams using software such as Microsoft Excel). Typically, there has been significant duplication of efforts. Preexisting models generated by industrial engineers and other ICS personnel have generally not been leveraged. Instead, security personnel have typically compiled information on their own, informally, from a number of sources. Such techniques have been extremely time-consuming, error prone, and are not scalable to large infrastructure projects. Further, the outputs generated in prior attempts have generally been less than ideal. Among other shortcomings, the outputs from such processes when displayed have lacked any visual representation of the connection between security threats and infrastructure assets. Users have had difficulty interpreting the information and utilizing it in an effective manner.

There is a need for improved techniques for security threat modeling and threat intelligence for infrastructure managed by ICSs. It would be desirable if such techniques could address some of the above noted problems of prior attempts, including efficiency, scalability, and usability problems, so they may be widely deployed. Wide deployment would improve the functioning of the ICSs and the safety and reliability of the infrastructure they control.

SUMMARY

Techniques are provided for improved security threat modeling and threat intelligence for infrastructure managed by ICSs. The techniques may leverage an existing model of an ICS created in a CAD application, add to the model security properties specifying configuration of respective electronic components of the ICS, and analyze the resulting combination, together with information from a threat database, to automatically generate output such as a threat model diagram, threat model report or an interactive threat intelligence dashboard. A visualization of the output may be displayed together with, or include, a graphical rendering of the infrastructure, to aid in its interpretation.

In one embodiment, threat modeling techniques for an ICS leverage an existing model. A CAD application executing on an electronic device accesses a CAD file that includes a model of infrastructure managed by the ICS, the model having elements that represent mechanical components of the ICS and electronic components of the ICS that interact with the mechanical components. One or more of the electronic components may be susceptible to having security threats. In response to user input in a user interface of the CAD application, the CAD application adds security properties to the CAD file for each of the one or more electronic components. A security tool accesses a threat database that includes threat information describing possible threats for electronic components, and combines the CAD file and threat information from the threat database. A threat modeling software process of the security tool then identifies threats applicable to the ICS, based on the combined CAD file (e.g., by querying security properties and threat information to find security threats indicated by relationships therebetween). The threat modeling software process of the security tool automatically generates an output (e.g., a threat modeling diagram or threat modeling report) that includes information describing each identified security threat and displays a visualization of the output on a display screen of the electronic device.

In another embodiment, threat intelligence techniques for an ICS leverage an existing model. The security tool accesses a CAD file that includes a model of infrastructure managed by an ICS, the model having elements that represent mechanical components of the ICS and electronic components of the ICS that interact with the mechanical components. A threat intelligence software process of a security tool identifies one or more electronic components that are susceptible to having security threats. For each identified electronic component, the threat intelligence software process of the security tool determines when a new security threat is applicable to the electronic component (e.g., by querying a threat database and looking for relationships). The threat intelligence software process of the security tool generates an output (e.g., an interactive threat intelligence dashboard) that includes an alert associated with a portion of a graphical rendering (e.g., a isometric view, a top-down view or other sort of 2-D or 3-D view) of the infrastructure for each new security threat, and displays a visualization of the output and a visualization of the alert on a display screen of the electronic device.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
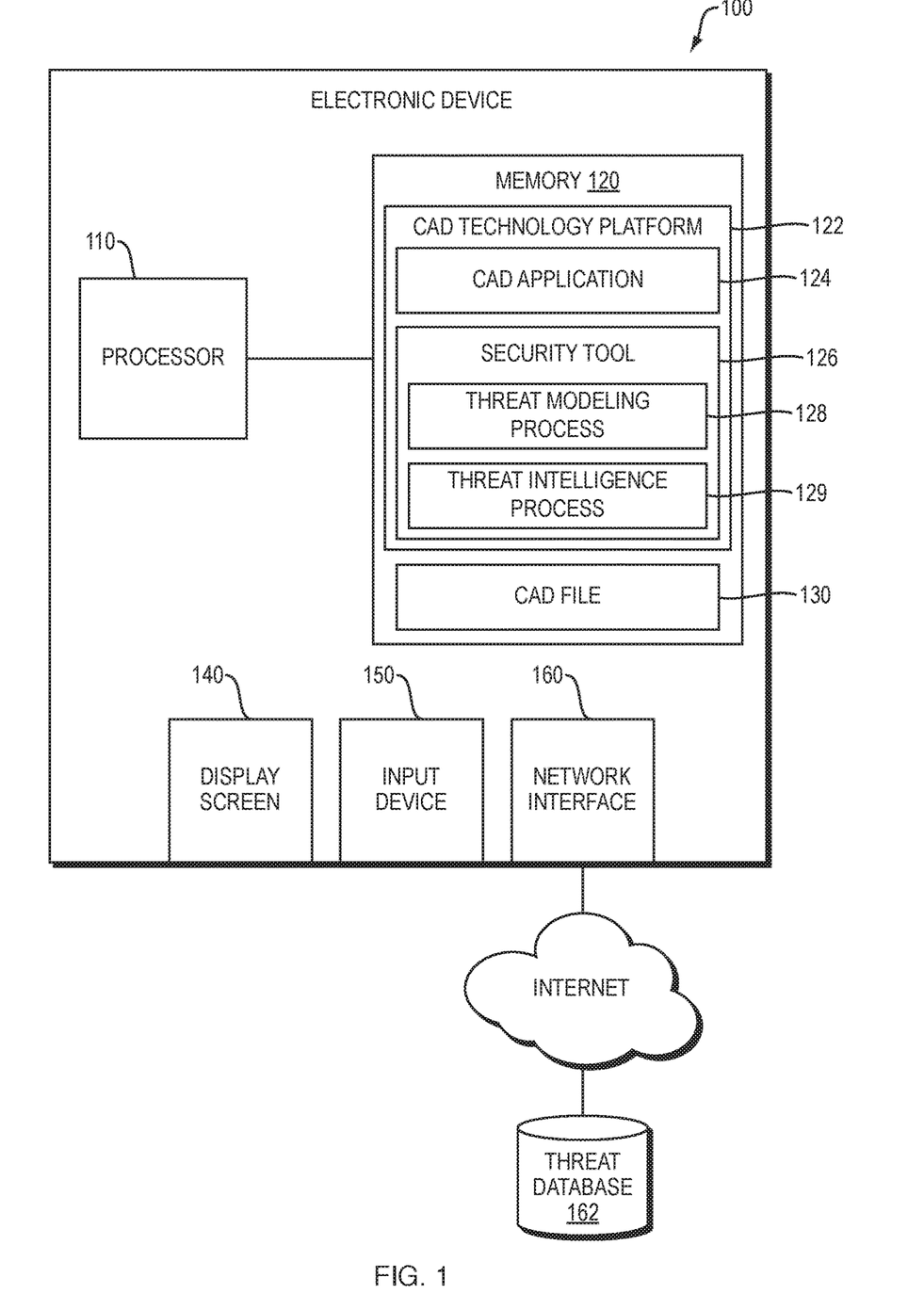
FIG. 1 is a block diagram of an example electronic device that may be used with techniques for security threat modeling and threat intelligence for ICSs that manage infrastructure.

FIG. 1 is a block diagram of an example electronic device 100 that may be used with techniques for security threat modeling and threat intelligence for ICSs that manage infrastructure. The electronic device 100 includes a processor 110 coupled to volatile and non-volatile memory/storage devices 120 that, among other things, store processor-executable instructions and data. The instructions include at least instructions of a CAD technology platform 122 that supports at least one CAD application 124 and a security tool 126 that includes a threat modeling software process 128 and a threat intelligence software process 129. In one implementation, the CAD technology platform 122 may be the Microstation® modeling, documentation, and visualization software package available from Bentley Systems, Inc. and the CAD application 124 may be the OpenPlant Modeler 3D plant design and modeling software application also available from Bentley Systems, Inc. The security tool 126 may be a separate software application that executes on the CAD technology platform 122, may be a part of the CAD application 124, or another software application (not shown).

The data includes at least a CAD file 130 that maintains a two-dimensional (2-D) or three-dimensional (3-D) model of infrastructure (e.g., a plant, transportation system, communication system, water/sewage distribution system, and other industrial system) managed by an ICS (e.g., a SCADA system or DCS). In a specific example referred to repeatedly below, the infrastructure may be a nuclear power plant. The model may be organized as a relational database (e.g., a SQLite® database) that includes a number of data tables according to a storage format (e.g., a DgnDb format). The data tables may store elements that describe individual components of the infrastructure and ICS, including mechanical components (e.g., turbines, valves, tanks, etc.) and electronic components that interact with/control the mechanical components (e.g., a human machine interface (HMI) station, programmable logic controller (PLC) controller, temperature sensor, etc.). In a specific example referred to repeatedly below, one or the electronic components may be a cellular router/multiprotocol intelligent node. Each element may include a number of CAD properties that describe physical characteristics (e.g., physical location, material composition, etc.) of the corresponding component. The model may group together related elements and mechanical/electronic relationship among the elements. A graphical view may be defined based on at least the physical properties of the elements and relationship information of the model.

In addition, the electronic device 100 further may include a display screen 140 configured to show a user interface of the CAD application 124 and security tool 126. Likewise, at least one input device 150 (e.g., a keyboard, a mouse, etc.) is provided to receive user input for interacting with the CAD application 124 and security tool 126. The electronic device 100 may also include a network interface 160 for accessing remotely hosted software and data. The remotely hosted data may include a threat database 162 that maintains a number of data tables describing security threats. The threat database 162 may be partitioned or otherwise logically divided into multiple portions, including a threat modeling portion and a threat intelligence portion. In some cases, the threat database 162 may be two separate databases. The threat database 162 may be specific to the CAD technology platform 122 and CAD application 124 (e.g., maintained by the same company that developed the CAD technology platform and CAD application), or maintained by a different organization. At least a portion of the threat database 162 may be accessed and loaded to non-volatile memory/storage devices 120 by the security tool 126 upon demand, and utilized for threat modeling and threat intelligence as described in more detail below.

Threat Modeling

Figure 2:
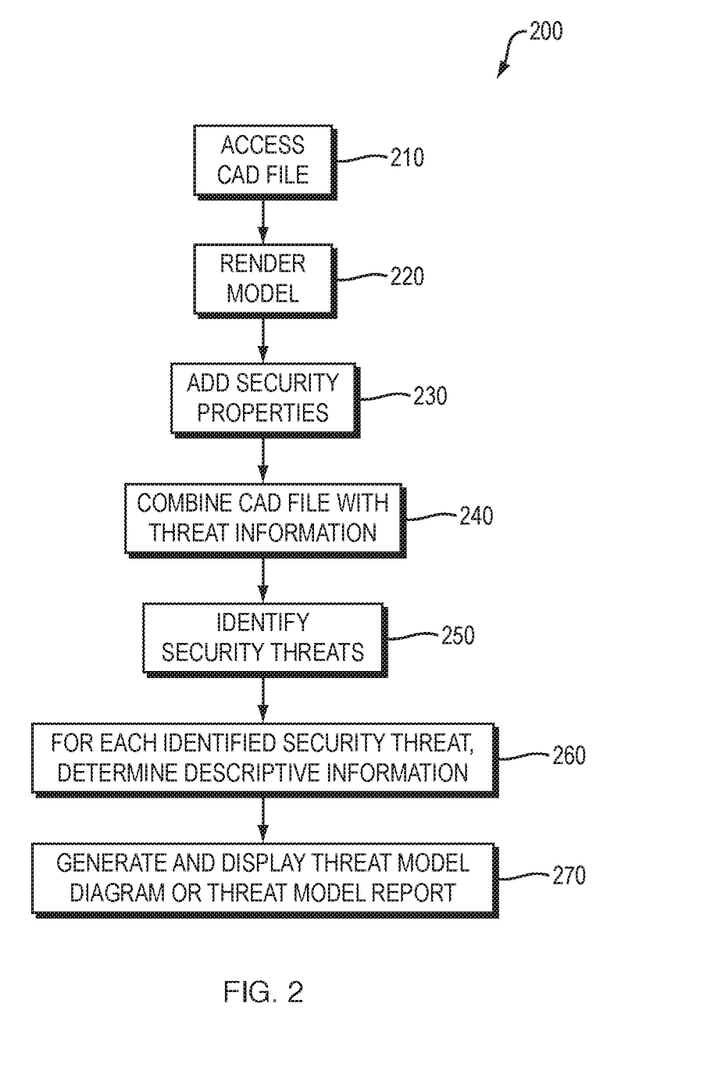
FIG. 2 is a flow diagram of an example sequence of steps for threat modeling of an ICS that manages infrastructure.

FIG. 2 is a flow diagram of an example sequence of steps 200 for threat modeling of an ICS that manages infrastructure. At step 210, in response to user input in the user interface (e.g., by security personnel), the CAD application 124 access an existing CAD file 130 that includes a model of the infrastructure (e.g., a nuclear power plant) managed by the ICS. The CAD file 130 may have been previously created by industrial engineers or ICS personnel using elements available in the CAD application 124 (e.g., in a preexisting library of elements). At least some of the elements may represent electronic components (e.g., a cellular router/multiprotocol intelligent node) to which one or more security threats may be applicable. Such elements may be associated with security asset information within the CAD file 130 that indicates a specific identity (e.g., manufacturer, model, version, firmware version, etc.) of the electronic component.

Figure 3:
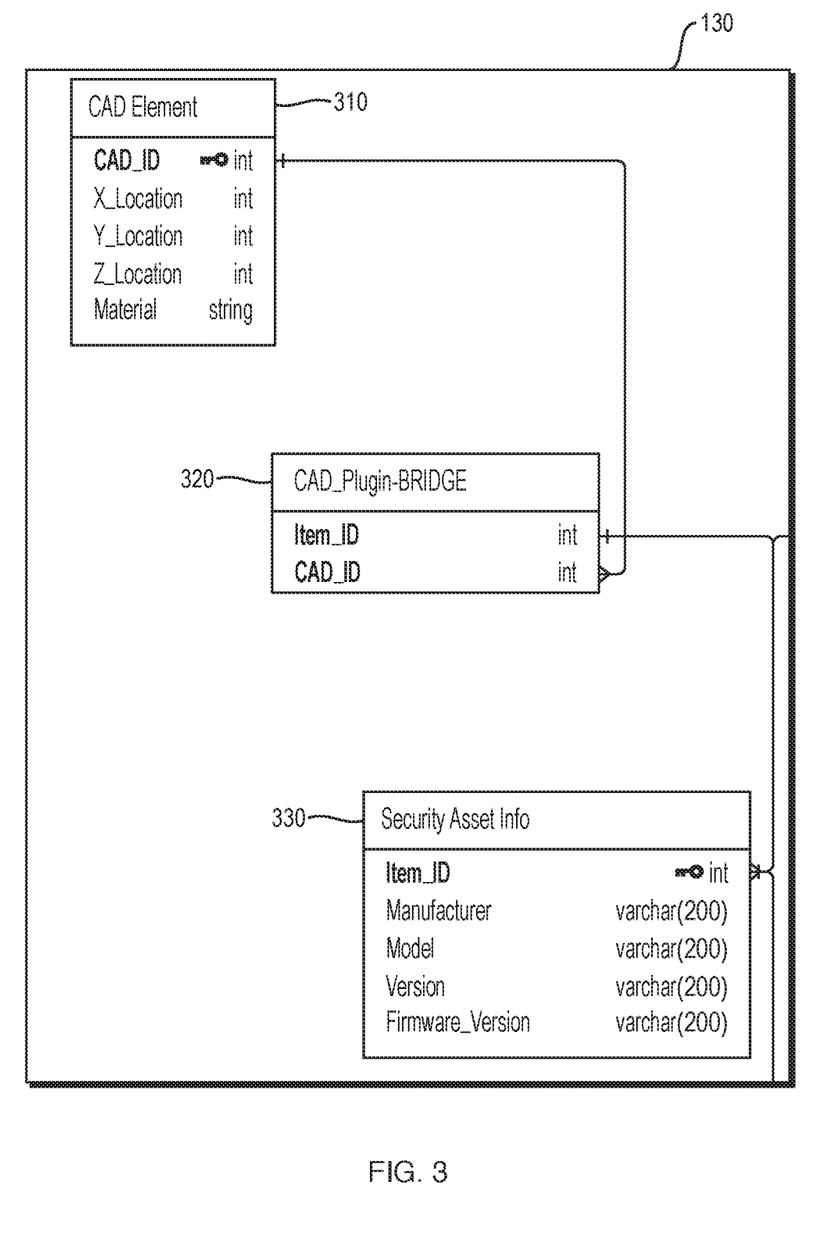
FIG. 3 is a data structure diagram showing an example of a relationship between a CAD element and security asset information maintained in a CAD file.

FIG. 3 is a data structure diagram 300 showing an example of a relationship between a CAD element and security asset information maintained in a CAD file 130. The CAD file 130 includes a CAD Element table 310 that includes properties of an electronic component (e.g., a cellular router/multiprotocol intelligent node) to which one or more security threats may be applicable. The properties may include a CAD identifier (ID), location properties and materials properties, among other physical properties. A CAD Plugin Bridge table 320 relates the CAD identifier from the CAD Element table 310 to an Item ID used to identify the electronic component in a Security Assets table. The Security Assets table 330 specifies an identity of the electronic component, including a manufacturer, model, version and firmware version.

At step 220, the CAD application 124 renders the model of the infrastructure (e.g., a nuclear power plant) managed by the ICS and displays the graphical rendering in a user interface of the CAD application 124 on the display device 140. The rendering may include an isometric view, a top-down view or other sort of 2-D or 3-D view of the infrastructure and ICS.

At step 230, in response to user input (e.g., by security personnel) in the user interface, the CAD application 124 adds security properties for each of the one or more electronic components that specify a configuration of the respective electronic component as deployed. The security properties may be entered in a security properties window of the user interface that may be displayed in response to selection of the electronic component in the rendering.

Figure 4:
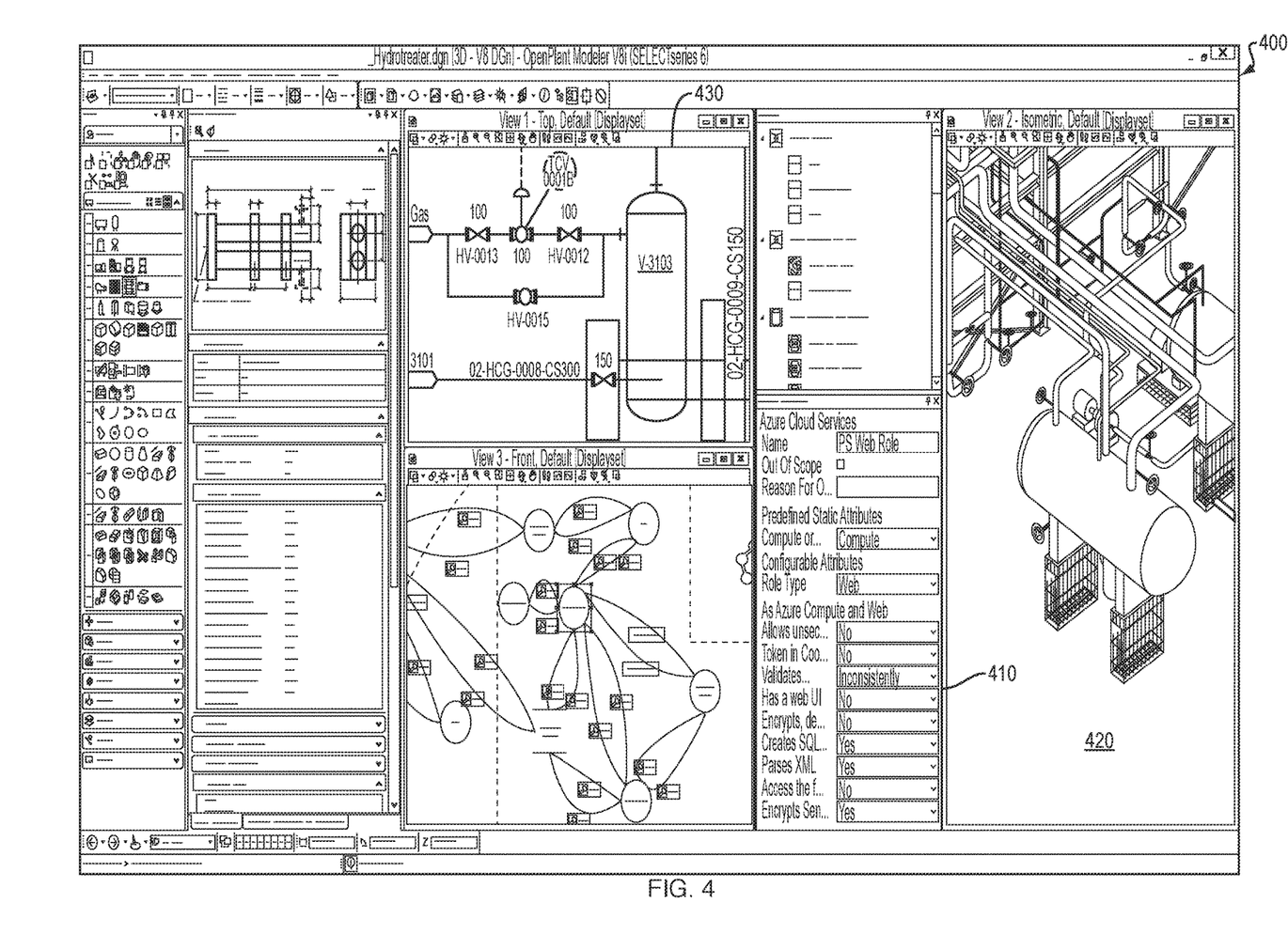
FIG. 4 is a screenshot of an example user interface of a CAD application, showing a security properties window for a selected electronic component.

FIG. 4 is a screenshot 400 of an example user interface of the CAD application 124, showing a security properties window 410 for a selected electronic component. The electronic component may have been selected, for example, by clicking on an element with input device 150 in the rendered isometric view 420 or top-down view 430 that are also shown. Various fields, menus, buttons and other interface elements may be included in the security properties window 410 for specifying the security properties of the respective electronic component. The security properties may include at least open ports, running services, predefined static attributes, configurable attributes, as well as other types of attributes and settings. At least some of the security attributes may be obtained from known default settings. For instance, the electronic component may be known to have some ports open by default used with specific services.

Figure 5:
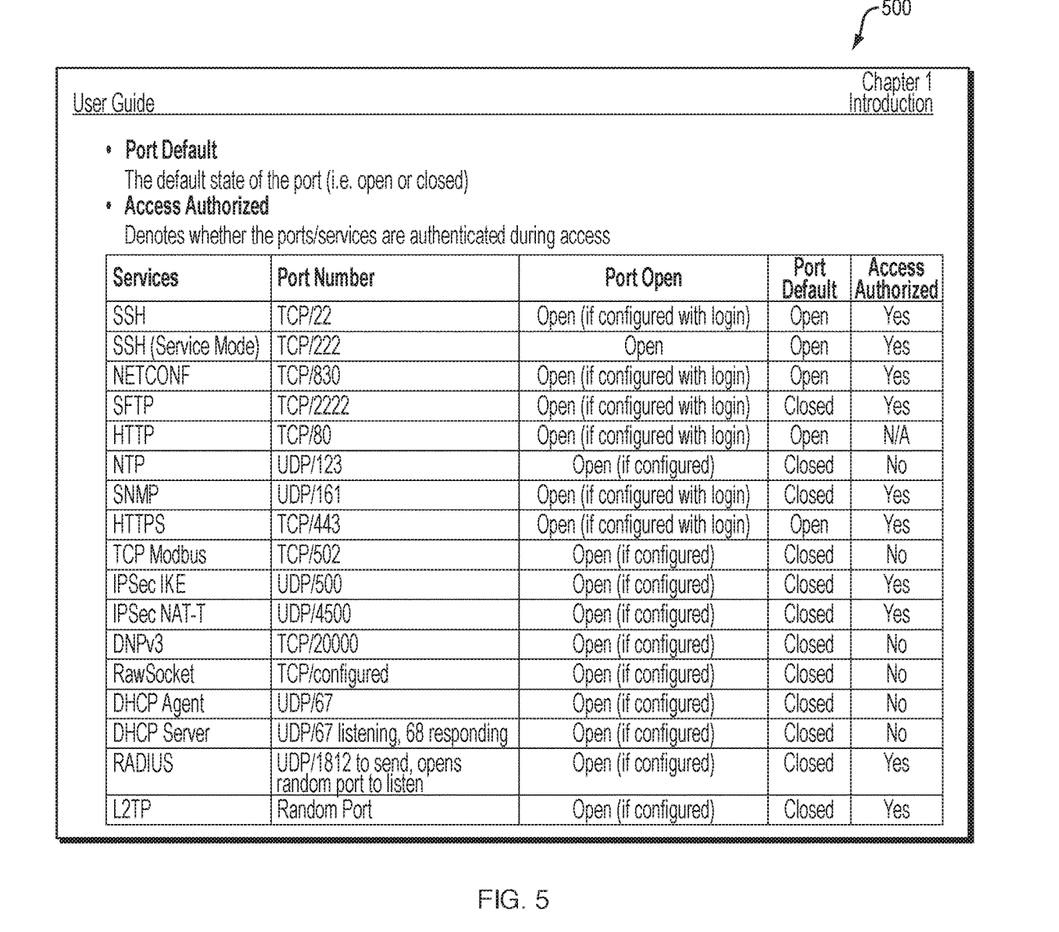
FIG. 5 is a table including an example listing of default open ports and running services for a cellular router/multiprotocol intelligent node.

FIG. 5 is a table 500 including an example listing of default open ports and running services for a cellular router/multiprotocol intelligent node. In such a case, the security personnel may enter in the security properties window 410 each of the port numbers that are set open by default (e.g., in a Ports Open field) and also fill in the type of service running on that specific port (e.g., in a Services field). This information may then be propagated to tables including a Properties table, Ports Open table and a Services table maintained in the CAD file 130.

Figure 6:
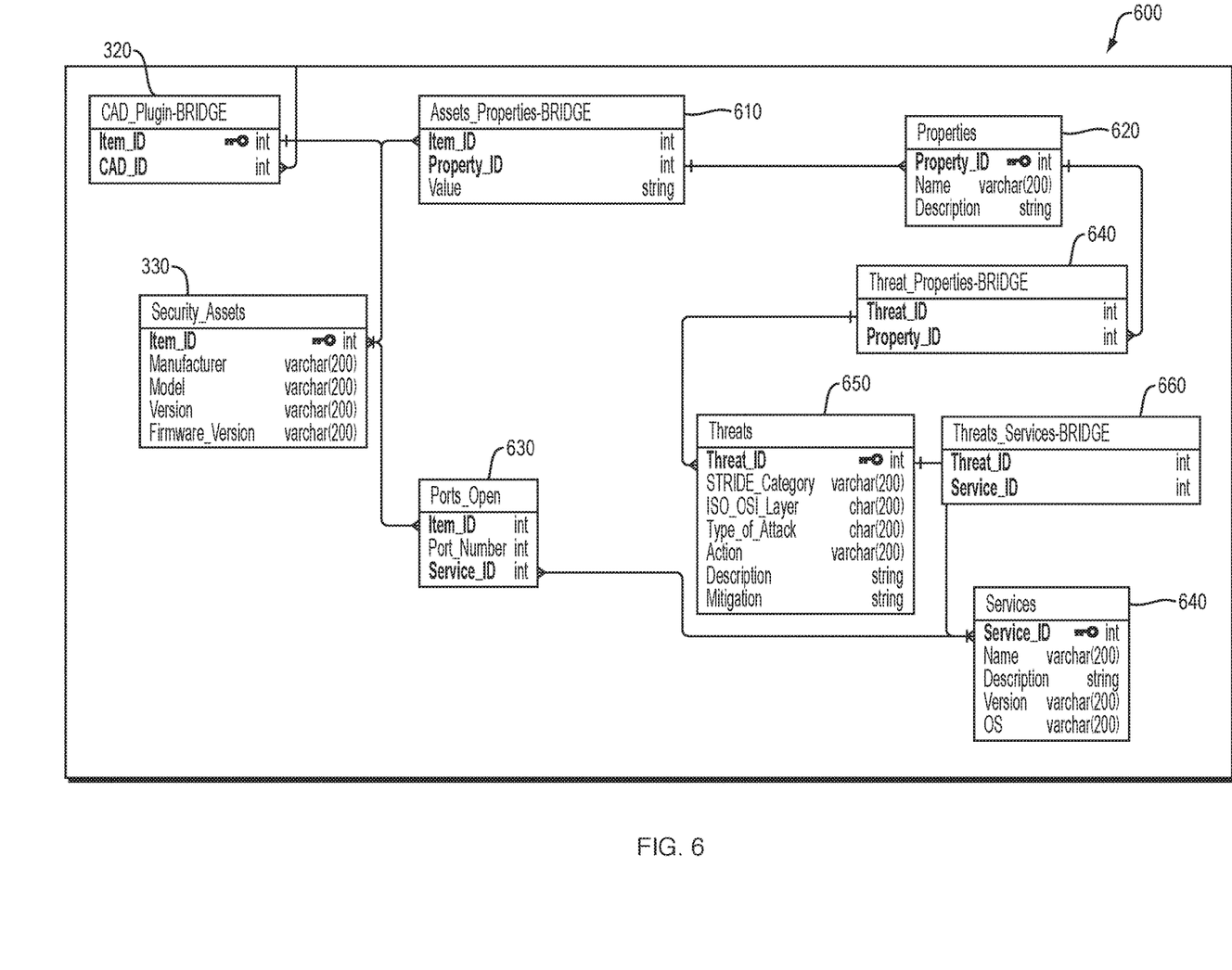
FIG. 6 is an expanded data structure diagram showing example security properties and threat correlations.

FIG. 6 is an expanded data structure diagram 600 showing example security properties and threat correlations. An Asset Properties Bridge table 620 relates the Item ID from the Security Assets table 330 that includes a name and description of related security properties. The Asset Properties Bridge table 610 also maintains relationships to additional tables that store specific security properties. For example, Properties Bridge table 620 relates the Item ID to a Ports Open table 630 that specifies port number of open ports and a Service ID for those ports. The Service ID relates to a Services table 640 that specifies services running on the respective ports, including a name, description version and operating system.

At step 240, the security tool 126, combines the existing CAD file 130 with the threat information from the threat database 162. The result is a combined CAD file 130 that includes security properties related to threat information about possible threats for those security properties. The threat information may be stored in a Threats table in the CAD file 130. A bridge table may relate the threat information in the Threats table to other tables, including the Properties table, Ports Open table and Services table maintained in the CAD file 130.

Returning to FIG. 6, a Threat Properties Bridge table 640 relates the Property ID from the Properties table 620 to a Threat ID. The Threat ID is associated with a threat in the Threats table 650 that specifies a stride category, stack layer, attack type, action, description and mitigation information. A Threats Service Bridge table 660 relates the Threat ID from the Threats table 650 to a Service ID which identifies a service in the Services table 640, which is in turn related to an open port in the Ports Open table 620. In this manner, relationships are established between threat information and security information.

Figure 7A:
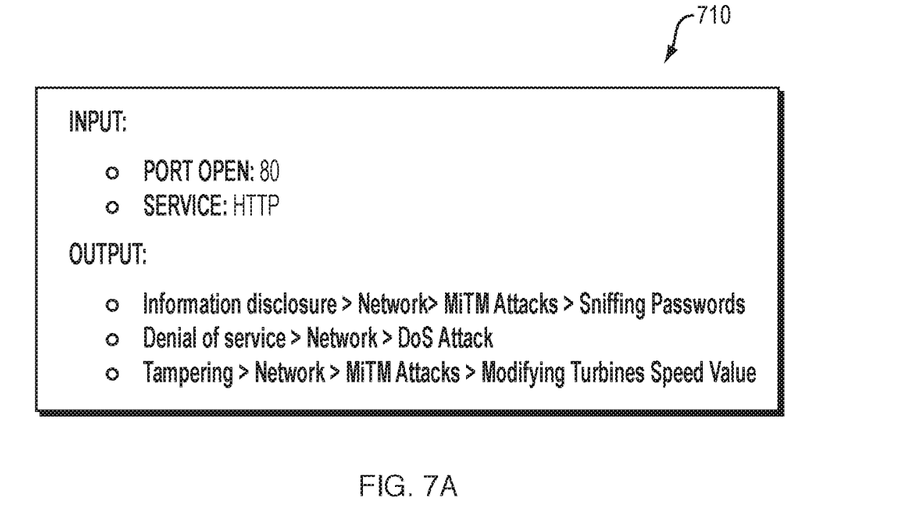
FIG. 7A is an example listing of input and output of a threat modeling software process for identifying a security threat.

At step 250, a threat modeling software process 128 of the security tool 126, identifies one or more security threats applicable to the ICS based on the combined CAD file. This may be performed by querying the security properties (e.g., stored in the Ports Open table 630 and Services table 640) and threat information (e.g., stored in the Threats table 650) to find security threats among the relationships. For example, consider a specific case for a cellular router/multiprotocol intelligent node used in a nuclear plant. FIG. 7A is an example listing 710 of input and output of the threat modeling software process 128 for identifying a security threat. The threat modeling software process 128 queries Ports Open table 630 and Services table 640 to determine the cellular router/multiprotocol intelligent node has an open port 80 that is running an HTTP service, as shown in the input. The threat modeling software process 128 also queries the Threats table 650 to determine security threats related thereto, for example, a security threat of information disclosure due to a man-in-the-middle (MiTM) attack sniffing passwords, a security threat of a denial of service (DoS) attack, and a security threat of tampering via a MiTM attack to modify turbine speed values, as shown in the output.

Figure 7B:
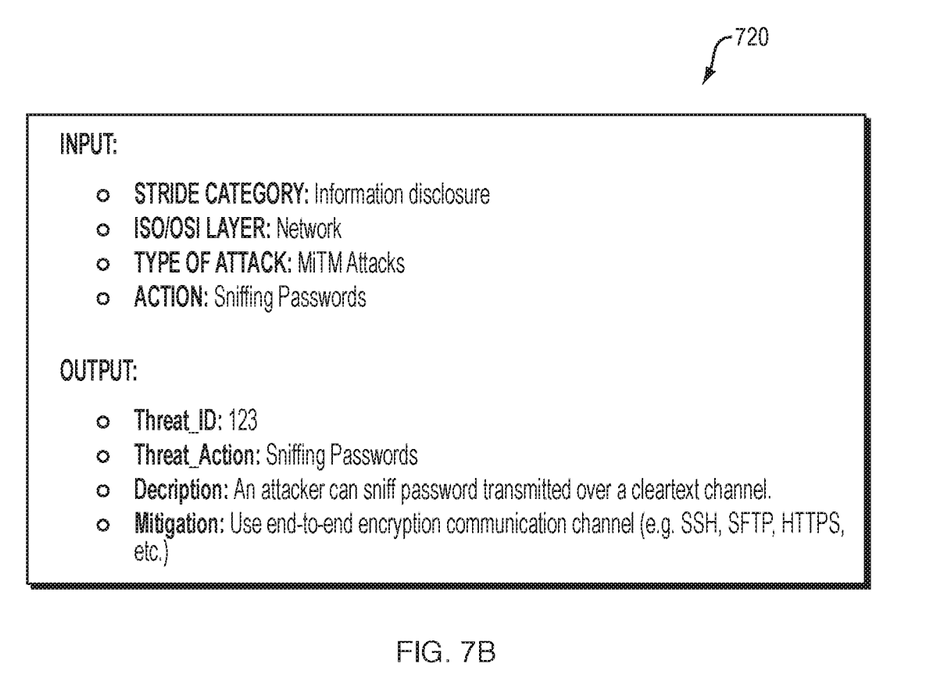
FIG. 7B is an example listing of input and output of a threat modeling software process for determining information describing a security threat.

At step 260, the threat modeling software process 128 of the security tool 126, for each identified security threat, determines information describing the identified security threats by performing additional queries. This may be performed by querying threat information (e.g., stored in the Threats table 650) to extract information related to the specific identified security threat. FIG. 7B is an example listing 720 of input and output of the threat modeling software process 128 for determining information describing a security threat, continuing the example from FIG. 7A. In this case, the security threat is a MiTM attack involving sniffing passwords and the determining obtains descriptive information such as a Threat ID, an action, description and mitigation information for that security threat.

Finally, at step 270, the threat modeling software process 128 of the security tool 126 generates an output that includes information describing each identified security threat. The output may be maintained the CAD file 130 allowing subsequent reuse and refinement of the threat information contained therein. Alternatively, the output could be maintained in a database file (e.g., SQLite file) or other format.

A visualization of the output may be displayed in the user interface of the CAD application 124 on the display screen 140. Likewise, a copy of the visualization of the output may be saved to a text and/or graphics file (e.g., a .pdf file). Such file may be locally stored, exported in cloud storage, printed, or otherwise maintained or used.

Figure 8:
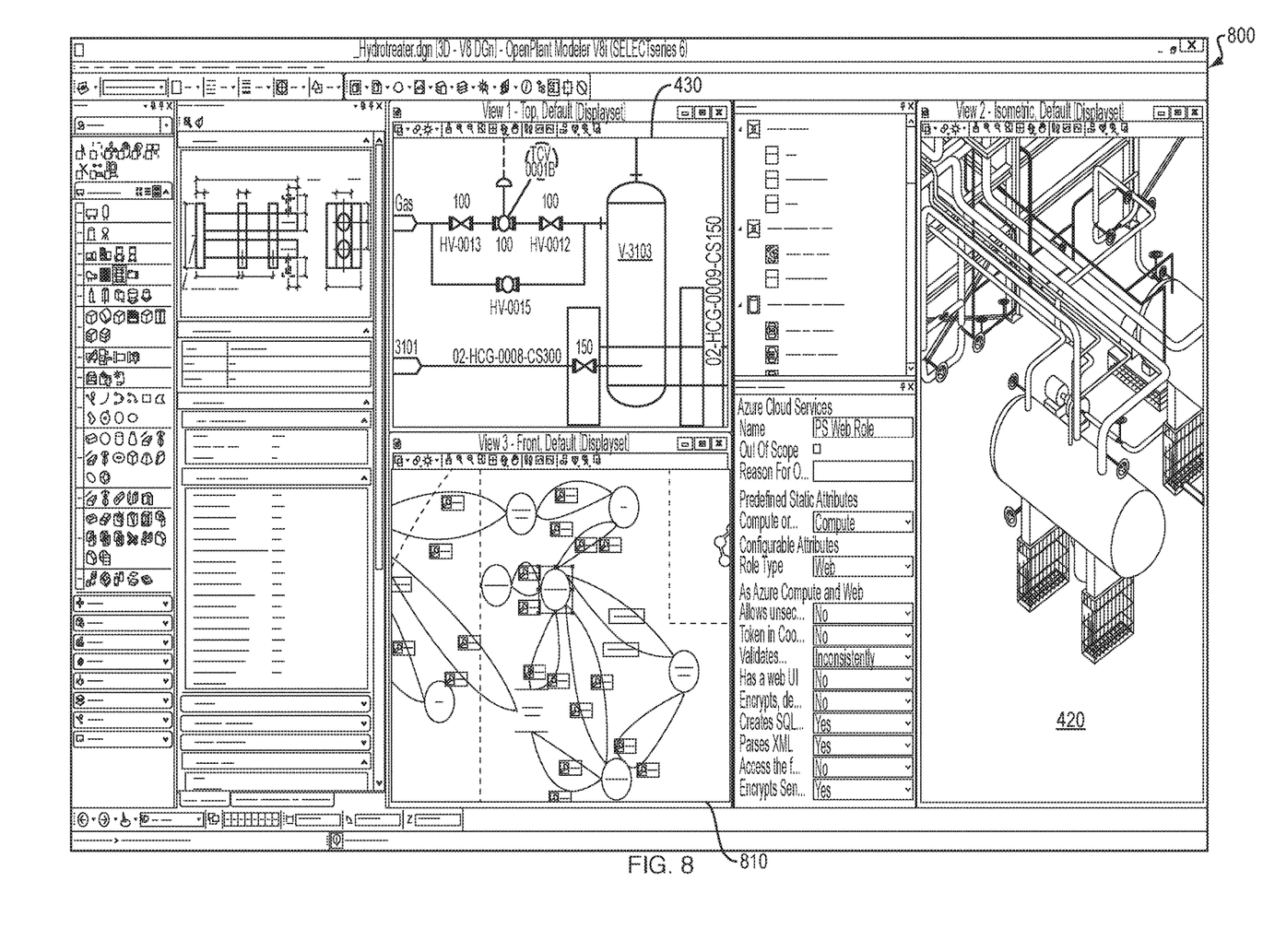
FIG. 8 is a screenshot of an example user interface showing an example threat model diagram.

The visualization may include a graphical rendering of the infrastructure and ICS (e.g., as an isometric view, a top-down view and/or other 2-D or 3-D view). In one implementation, the output may take the form of a threat model diagram (e.g., a threat model data flow diagram or threat model process flow diagram) that provides a graphical representation of data flow or process relationships. The threat model diagram may be formatted in any of a number of modeling languages, for example, unified modeling language (UML). FIG. 8 is a screenshot 800 of an example user interface showing an example threat model diagram 810. The threat model diagram 810 is shown here together with both an isometric view 420 and a top-down view 430 of the infrastructure.

Figure 9:
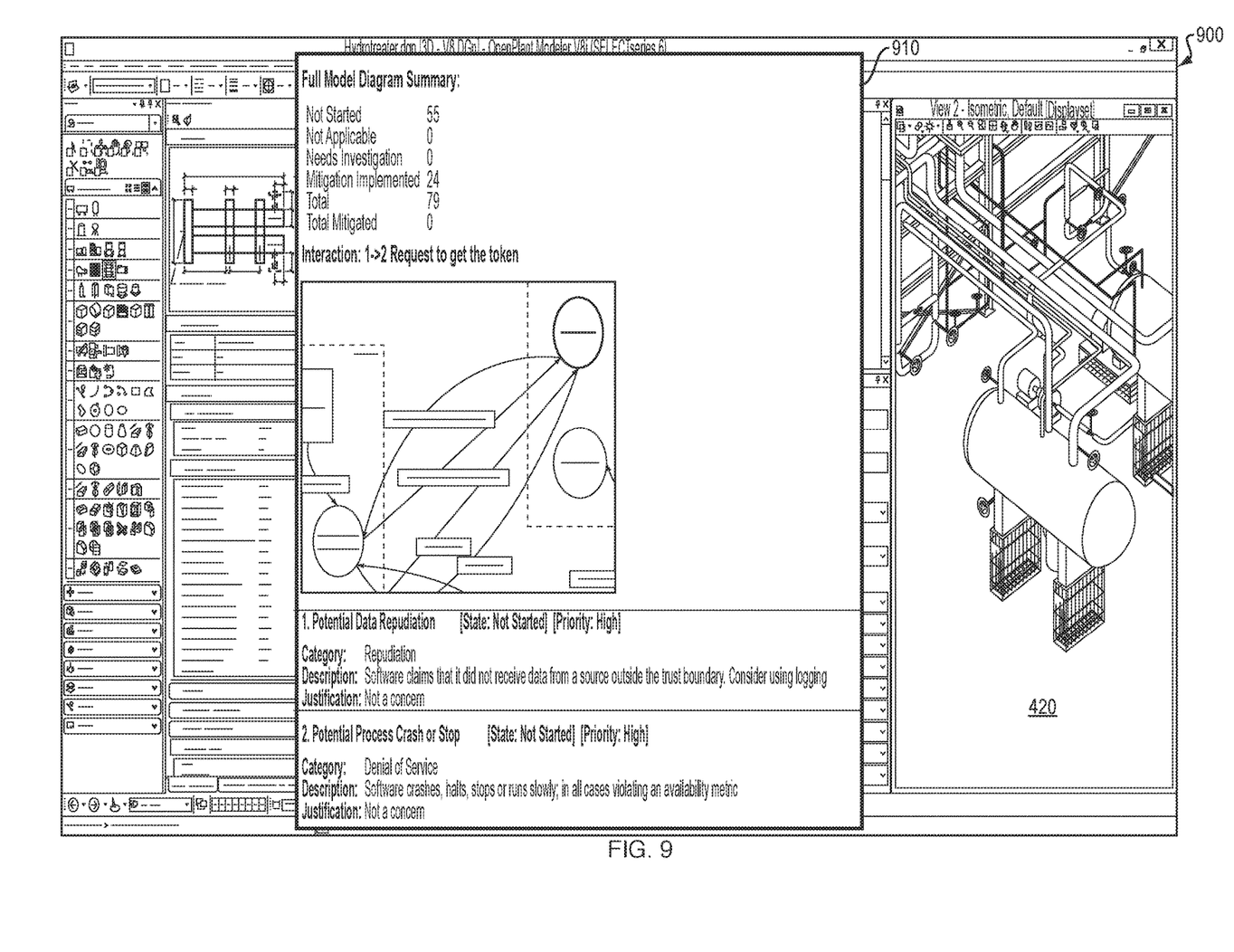
FIG. 9 is a screenshot of an example user interface showing an example threat model report.

In another implementation, the output may take the form of a threat model report that includes a threat model diagram and a summary of each identified security threat. FIG. 9 is a screenshot 900 of an example user interface showing an example threat model report 910. The threat model report 910 is shown here together with an isometric view 420 of the infrastructure.

Using either the threat model diagram 810 or the threat model report 910, security personnel may identify actual security threats and false-positives, and indicate this information in the user interface. Based on the indication, the security tool 126 may update the Threats table 650 in the CAD file 130 (e.g., to include a Boolean flag indicating a false positive) to prevent inclusion of the false-positives in output. In some cases, the security tool 126 may also notify the threat database 162.

Threat Intelligence

Figure 10:
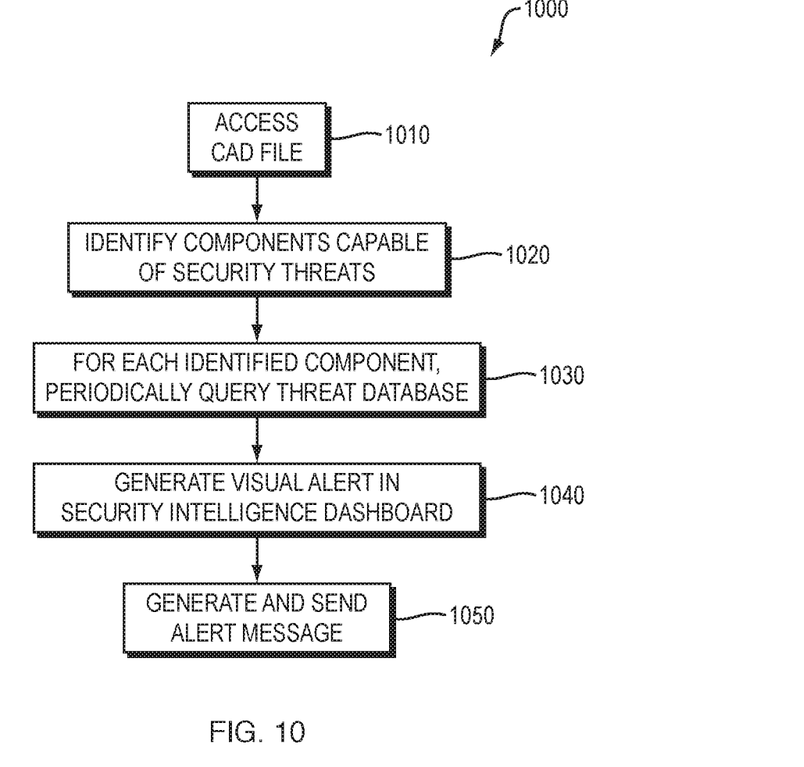
FIG. 10 is a flow diagram of an example sequence of steps for threat intelligence for an ICS that manages infrastructure.

FIG. 10 is a flow diagram of an example sequence of steps 1000 for threat intelligence for an ICS that manages infrastructure. At step 1010, the security tool 126 access a CAD file 130 that includes a model of the infrastructure (e.g., a nuclear power plant) managed by the ICS. The CAD file 130 may have been previously created by industrial engineers or ICS personnel using elements available in the CAD application 124 (e.g., in a preexisting library of elements). At least some of the elements may represent electronic components (e.g., a cellular router/multiprotocol intelligent node) to which one or more security threats may be applicable. Such elements may be associated with security asset information within the CAD file 130 that indicate a specific identity (e.g., manufacturer, model, version, firmware version, etc.) of the electronic components. Such elements may further be associated with security properties that specify a configuration of the electronic components as deployed. The security properties may have been previously entered in a security properties window by security personal, and stored in the CAD file 130, as discussed above in reference to step 230 of FIG. 2.

At step 1020, the threat intelligence software process 129 of the security tool 126 identifies the electronic components of the ICS that are susceptible to having security threats (e.g., that have been associated with security asset information and security properties within the CAD file 130).

At step 1030, for each identified electronic component, the threat intelligence software process 129 of the security tool 126, determines when a new security threat is applicable to the electronic component based on new threat information in the threat database 162. This may be performed by periodically querying the threat database 162 to determine relationships between the security asset information (and security properties) of the electronic component and the new threat information maintained in respective data tables, for example, to determine if new security updates are available for the electronic component, new threats are identified for the electronic component, new malicious campaigns are ongoing for the electronic component, etc.

Figure 11:
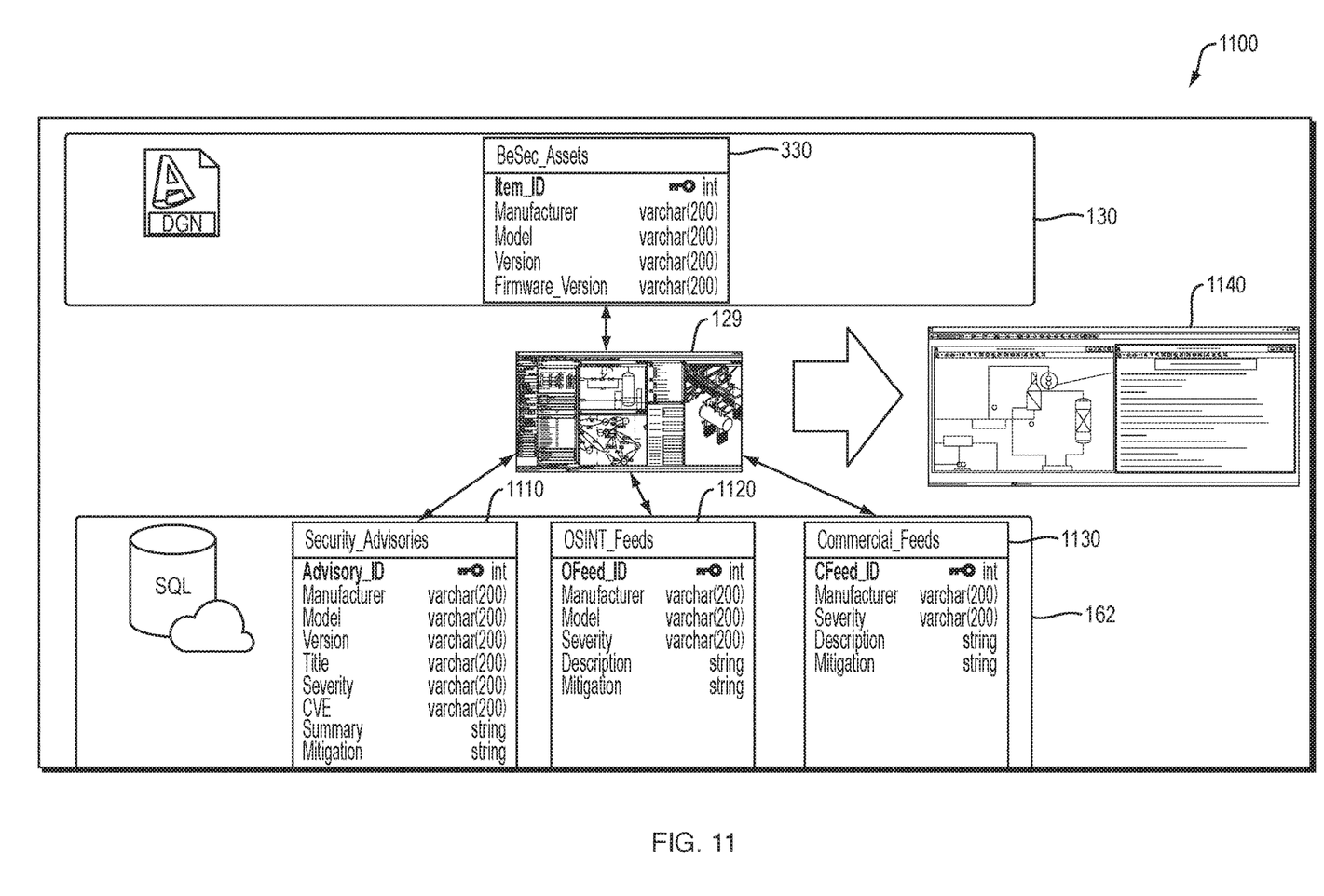
FIG. 11 is a diagram illustrating and example technique for determining new security threats by periodically querying a threat database to determine relationships.

FIG. 11 is a diagram 1100 illustrating an example technique for determining new security threats by periodically querying the threat database 162 to determine relationships. The intelligence software process 129 has access to the Security Assets table 330 that specifies an identity of the electronic component, including a manufacturer, model, version and firmware version, and tables describing security properties, such as the Properties table 620, Ports Open table 630, Services table 640, etc. (not shown). The intelligence software process 129 periodically queries (e.g., every 30 minutes) the threat database 162 which may include a Security Advisory table 1110 that stores security advisories for new threats, including Advisory ID, manufacture, model, version, title, common vulnerabilities and exposure (CVE), summary and mitigation strategy; an Open Source Intelligence Feeds table 1120 that stores updates for new security threats, including an Open Source Feed ID, manufacturer, model, severity and mitigation strategy, a Commercial Feeds table 1130 that stores updates for new security threats, including an Commercial Feed ID, manufacturer, model, severity and mitigation strategy, as well as any of a number of other data tables. When there is a match between identity and security properties and new security threat information in the tables 1110, 1120, 1130 of threat database 162, the threat intelligence software process 129 determines there is a new security threat applicable, and updates an interactive security dashboard 1140.

At step 1040, for each new security threat applicable, the threat intelligence software process 129 generates an alert. The alert may be visually represented in an interactive security intelligence dashboard displayed on the display screen 140. The security intelligence dashboard may be shown to security personnel whose duties include actively monitoring the security of the infrastructure and ICS. The security intelligence dashboard may include a graphical rendering of the infrastructure and ICS (e.g., an isometric view, a top-down view or other sort of 2-D or 3-D view) based on the model in the CAD file 130. The visual alert may be associated with a portion of the graphical rendering (e.g., the portion that depicts the electronic component having the new security threat). In one implementation, the visual alert may include highlighting the portion (e.g., in red). Alternatively, the visual alert may include providing a visual indicator on or around the portion (e.g., a red circle around the portion). Automatically, or in response to selecting the portion (e.g., with input device 150), a summary window for the new security threat may also be displayed. The summary window may include a title, severity indicator, CVE number, publication date, description, mitigation strategy, and or other summary information.

Figure 12:
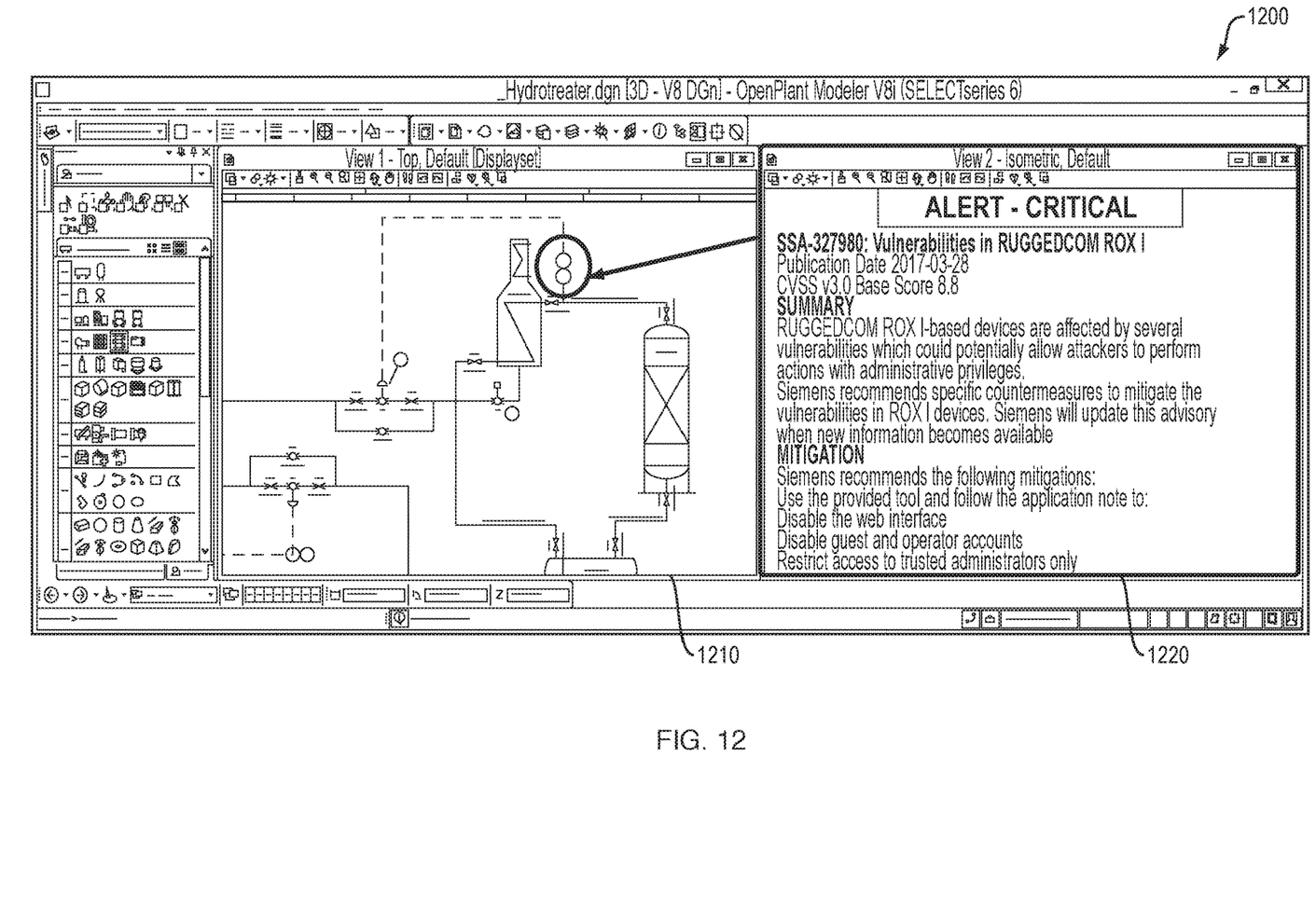
FIG. 12 is a screenshot of an example interactive security dashboard showing a security alert identifying a portion of a 2-D view.

FIG. 12 is a screenshot 1200 of an example interactive security intelligence dashboard showing a security alert 1210 identifying a portion of a 2-D view. A summary window 1220 includes summary information for a new security threat.

The alert may also include non-visual notifications. At optional step 1050, an alert message is generated for the new security threat (e.g., an email notification, instant massager notification, short message service (SMS) notification, etc.) and sent to security personnel. Such alert message may be useful in off-duty hours or when security personnel are otherwise busy and cannot be actively monitoring the security intelligence dashboard 1040.

In summary, the above description discusses example techniques for threat modeling and threat intelligence for an ICS that leverage an existing model of the ICS. It should be understood that a number of modifications and/or additions may be made without departing from the disclosure's intended spirit and scope. For instance, while it is described above that the security tool 126 that includes the threat modeling software process 128 and the threat intelligence software process 129 may be executed on an electronic device 100, it should be understood that a variety of distributed and/or cloud-based implementations are also possible, where portions of the security tool 126 and/or software processes are executed on multiple electronic devices that may be physically remote from each other. For example, the security tool 126 may be provided as part of cloud-based software that is accessed via infrastructure modeling hub services that provide centralized management and synchronization support to a model of infrastructure.

Further, while several of the examples above involve open ports and running services, it should be remembered that the security properties may include a wide variety of other types of configuration for the respective components, and a wide number of tables may be employed in the data structure diagram 600 in addition to, or instead of, the Ports Open table 630 and Services table 640. These other security properties may be correlated to different security threats, for example, communication channel threats, protocol version threats, default credential threats, etc. Use of open ports and running services in the above examples is simply for purposes of explanation of the general operation.

Further it should be understood that many of the above discussed techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method for threat modeling an industrial control system (ICS) that manages infrastructure, comprising:
    accessing, by a computer aided design (CAD) application executing on one or more electronic devices, a CAD file that includes a model of infrastructure managed by the ICS, the model having elements that represent mechanical components of the ICS and electronic components of the ICS that interact with the mechanical components, one or more of the electronic components susceptible to having security threats;
    adding to the CAD file, in response to user input in a user interface of the CAD application, security properties for each of the one or more electronic components, the security properties specifying a configuration of the respective electronic component;
    accessing a threat database that includes threat information describing possible threats for electronic components;
    combining the CAD file that includes the model of infrastructure managed by the ICS and the threat information from the threat database to produce a combined CAD file that includes both the model of infrastructure managed by the ICS and relations between the security properties and the threat information;
    identifying by a threat modeling software process, one or more security threats applicable to the ICS, based on the combined CAD file; and
    automatically generating, by the threat modeling software process, an output that includes information describing each identified security threat and displaying a visualization of the output on a display screen of the electronic device.

2. The method of claim 1, wherein the visualization comprises a threat model diagram that provides a graphical representation of data flow or process relationships.

3. The method of claim 1, wherein the visualization comprises a threat model report that includes both a threat model diagram and a summary of each identified security threat.

4. The method of claim 1, wherein the visualization is displayed together with a graphical rendering of the infrastructure and ICS in the user interface of the CAD application.

5. The method of claim 1, wherein the adding further comprises:
    displaying a security properties window in the CAD application for each of the one or more electronic components; and receiving the security properties for each of the one or more electronic components in the respective security properties window.

6. The method of claim 1, wherein the security properties include at least open ports and running services.

7. The method of claim 1, wherein the identifying further comprises:
querying security properties for each of the one or more electronic components in the CAD file and threat information to find security threats among relationships therebetween.

8. The method of claim 7, wherein the security properties are maintained as a plurality of relational database data tables and the security threats are maintained as a plurality of relational database data tables, and the combining comprises generating properties bridge tables that relate security properties to the security threats.

9. The method of claim 8, further comprising:
for each identified security threat, determining the information describing the identified security threat by querying the threat data tables.

10. The method of claim 1, further comprising:
receiving an indication that at least one identified security threat is a false-positive; and
in response to receiving the indication, marking the identified security threat to prevent inclusion thereof in subsequent output.

11. The method of claim 1, further comprising:
identifying, by a threat intelligence software process executing on one or more electronic devices, one or more electronic components of the ICS that are susceptible to having new security threats;
for each identified electronic component, determining, by the threat intelligence software process, when a new security threat is applicable to the electronic component based on new threat information in the threat database; and
generating an output that includes an alert associated with a portion of a graphical rendering of the infrastructure and ICS for each new security threat, and displaying a visualization of output that includes a visualization of the alert on the display screen of the electronic device.

12. The method of claim 11, wherein the output is an interactive threat intelligence dashboard, the graphical rendering is a 2-D or 3-D view of the infrastructure and ICS, and the association is visually indicated by highlighting a portion of the 2-D or 3-D view corresponding to the new security threat.

13. The method of claim 11, further comprising:
in response to receiving user input on the portion of the graphical rendering, displaying a summary of the new security threat.

14. The method of claim 11, wherein the identifying further comprises:
querying security properties for each of the one or more electronic components in the CAD file and threat information to find security threats among relationships therebetween.

15. The method of claim 11, wherein security asset information of the one or more electronic components is maintained as a relational database data table and the new threat information is maintained as one or more relational database data tables, and the determining further comprises:

periodically querying, by the threat intelligence software process, the threat database to determine relationships between the security asset information and the new threat information.

16. The method of claim 11, wherein the threat database includes at least one of security advisories, open source intelligence feeds or commercial intelligence feeds.

17. A non-transitory electronic device readable medium having instructions stored thereon, the instructions when executed by one or more processors of one or more electronic devices operable to:
access a computer aided design (CAD) file that includes a model of infrastructure managed by an industrial control system (ICS), the model having elements that represent mechanical components of the ICS and electronic components of the ICS that interact with the mechanical components, one or more of the electronic components susceptible to having security threats;
add to the CAD file security properties entered by a user for each of the one or more electronic components, the security properties specifying a configuration of the respective electronic component;
access a threat database that includes threat information describing possible threats for electronic components;
combine the CAD file that includes the model of infrastructure managed by the ICS and the threat information from the threat database to produce a combined CAD file that includes both the model of infrastructure managed by the ICS and relations between the security properties and the threat information;
identify one or more security threats applicable to the ICS, based on the combined CAD file; and
automatically generate a threat model diagram or threat model report that includes the identified one or more security threats and display the threat model diagram or threat model report.

18. The non-transitory electronic device readable medium of claim 17, wherein the threat model diagram or threat model report is displayed together with a graphical rendering of the mechanical components and electronic components.

19. The non-transitory electronic device readable medium of claim 17, wherein the instructions when executed by the one or more processors of one or more electronic devices are further operable to:
identify one or more electronic components of the ICS that are susceptible to having new security threats;
for each identified electronic component, determine when a new security threat is applicable to the electronic component and the security properties thereof based on new threat information in a threat database; and
generate and display an interactive threat intelligence dashboard that includes a visual alert associated with a portion of a graphical rendering of the infrastructure and ICS for each new security threat.

20. The non-transitory electronic device readable medium of claim 19, wherein the security properties of the one or more electronic components are maintained as a plurality of relational database data tables and the new threat information is maintained as a plurality of relational database data tables, and the instructions operable to determine when a new security threat is applicable are further operable to periodically query the threat database to determine relationships between the security properties data table and the new threat information data tables.

* * * * *

UNITED STATES PATENT AND TRADEMARK OFFICE
CERTIFICATE OF CORRECTION

PATENT NO. : 11,500,997 B1
APPLICATION NO. : 16/263982
DATED : November 15, 2022
INVENTOR(S) : Luca Bongiorni et al.

It is certified that error appears in the above-identified patent and that said Letters Patent is hereby corrected as shown below:

In the Specification

Column 2, Line 11 Should read:
been significant duplication of efforts. Pre-existing models Signed and Sealed this
Nineteenth Day of March, 2024

Katherine Kelly Vidal
*Director of the United States Patent and Trademark Office*